United States Patent
Wegkamp

(10) Patent No.: US 7,658,276 B2
(45) Date of Patent: Feb. 9, 2010

(54) DRIVE BEAM

(76) Inventor: Rene Wegkamp, No. G6 Scintille, North Road, Rivonia, 2128, Sandton (ZA)

( * ) Notice: Subject to any disclaimer, the term of this patent is extended or adjusted under 35 U.S.C. 154(b) by 81 days.

(21) Appl. No.: 12/093,305

(22) PCT Filed: Nov. 8, 2006

(86) PCT No.: PCT/IB2006/054161

§ 371 (c)(1),
(2), (4) Date: May 9, 2008

(87) PCT Pub. No.: WO2007/054901

PCT Pub. Date: May 18, 2007

(65) Prior Publication Data

US 2008/0264764 A1     Oct. 30, 2008

(30) Foreign Application Priority Data

Nov. 10, 2005   (ZA)   .................................. 05/9098

(51) Int. Cl.
B65G 25/04     (2006.01)
(52) U.S. Cl. ................................ 198/750.2; 198/750.5
(58) Field of Classification Search ... 198/750.2–750.6; 414/525.1
See application file for complete search history.

(56) References Cited

U.S. PATENT DOCUMENTS

| | | | | |
|---|---|---|---|---|
| 4,817,783 A * | 4/1989 | Foster | ..................... | 414/525.1 |
| 5,332,081 A * | 7/1994 | Quaeck | ..................... | 198/750.6 |
| 5,355,995 A * | 10/1994 | Foster | ..................... | 198/750.4 |
| 5,373,777 A | 12/1994 | Foster | | |
| 5,934,445 A * | 8/1999 | Foster et al. | ............. | 198/750.5 |
| 5,996,774 A * | 12/1999 | Foster | ..................... | 198/750.6 |
| 6,006,896 A * | 12/1999 | Foster | ..................... | 198/750.5 |
| 6,026,949 A * | 2/2000 | Foster | ..................... | 198/750.5 |
| 6,056,113 A * | 5/2000 | Foster | ..................... | 198/750.5 |
| 6,575,293 B2 * | 6/2003 | Foster | ..................... | 198/750.2 |
| 6,994,012 B2 * | 2/2006 | Foster | ..................... | 91/392 |
| 7,243,780 B1 * | 7/2007 | Foster et al. | ............. | 198/750.2 |
| 7,380,652 B2 * | 6/2008 | Foster | ..................... | 198/750.5 |
| 2002/0046927 A1 * | 4/2002 | Foster | ..................... | 198/750.4 |

FOREIGN PATENT DOCUMENTS

| | | |
|---|---|---|
| DE | 10046054 | 4/2002 |
| EP | 0 085 735 A1 | 8/1983 |
| EP | 1 452 467 A1 | 9/2004 |
| WO | WO 02/066346 A1 | 8/2002 |

OTHER PUBLICATIONS

International Search Report for International Application No. PCT/IB2006/054161, The International Bureau of WIPO, mailed Mar. 20, 2007, 2 pgs.
Written Opinion of the International Searching Authority.
Abstract of DE10046054, Publication Date: Apr. 4, 2002, 1 pg.

* cited by examiner

*Primary Examiner*—Mark A Deuble
(74) *Attorney, Agent, or Firm*—Sterne, Kessler, Goldstein & Fox P.L.L.C.

(57) ABSTRACT

A drive beam (18.2) for a reciprocating floor includes a pair of elongate U-shaped channel members with longitudinally extending edges arranged and welded together edge to edge to define an elongate substantially rectangular in transverse cross-section tube member with opposed welded side walls (718) each with a lengthwise welding seam. A pair of elongate opposed reinforcing members (712) is fast with a respective associated welded side wall (718) and located inside the tube member.

10 Claims, 8 Drawing Sheets

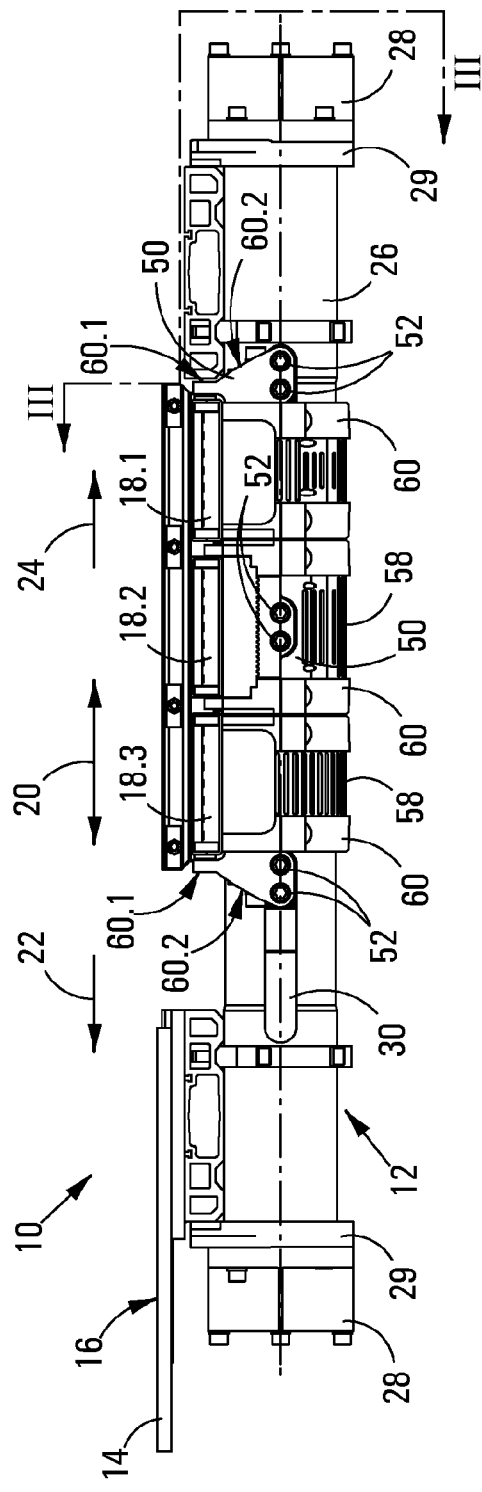
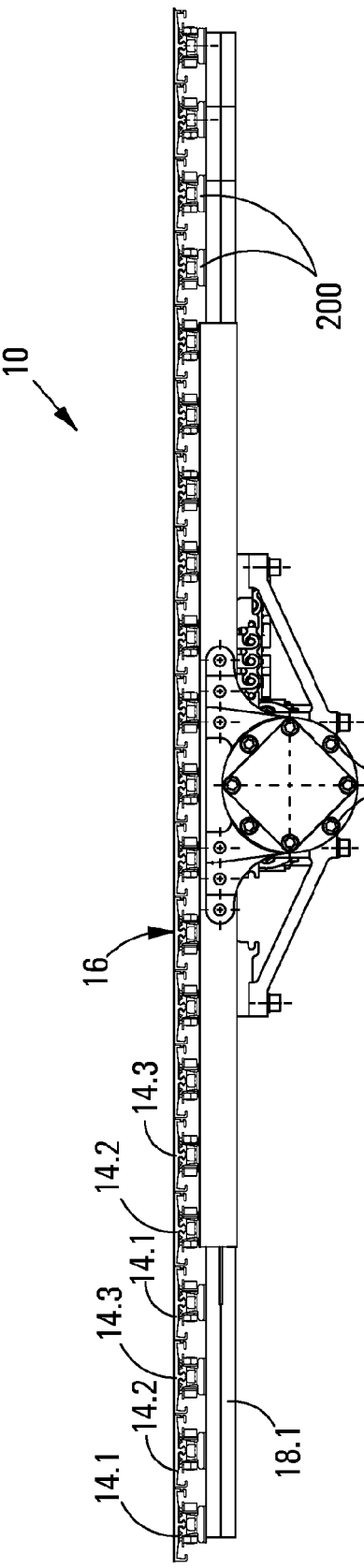

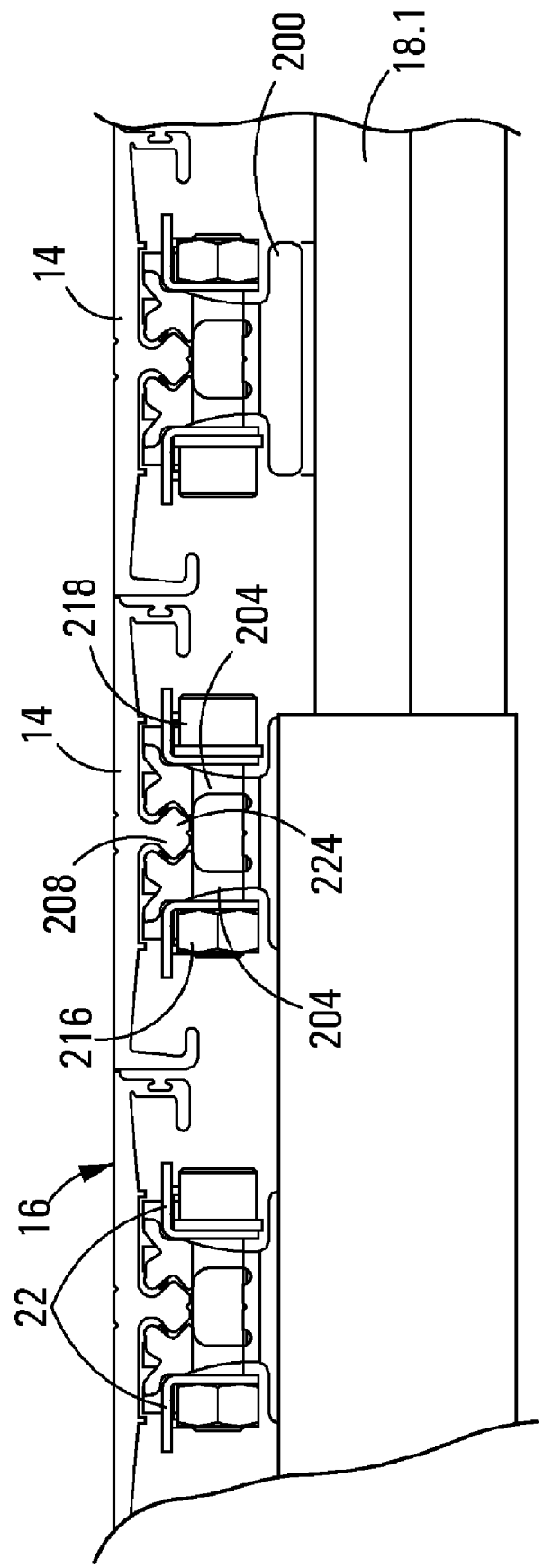

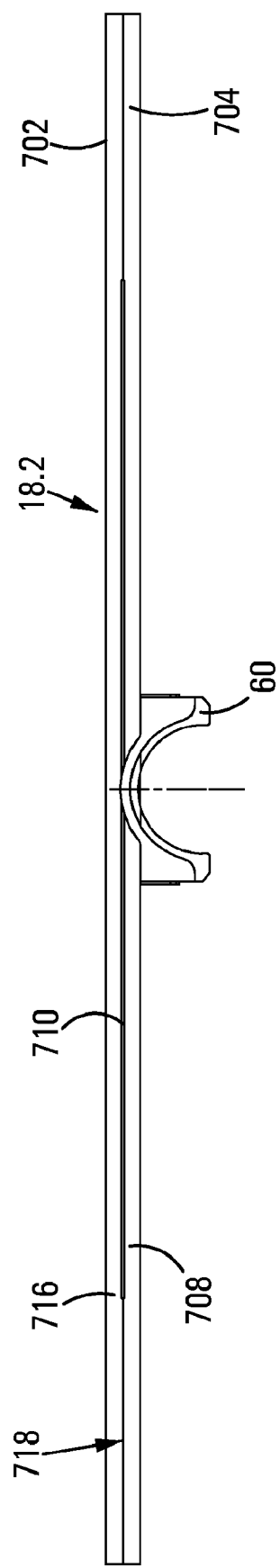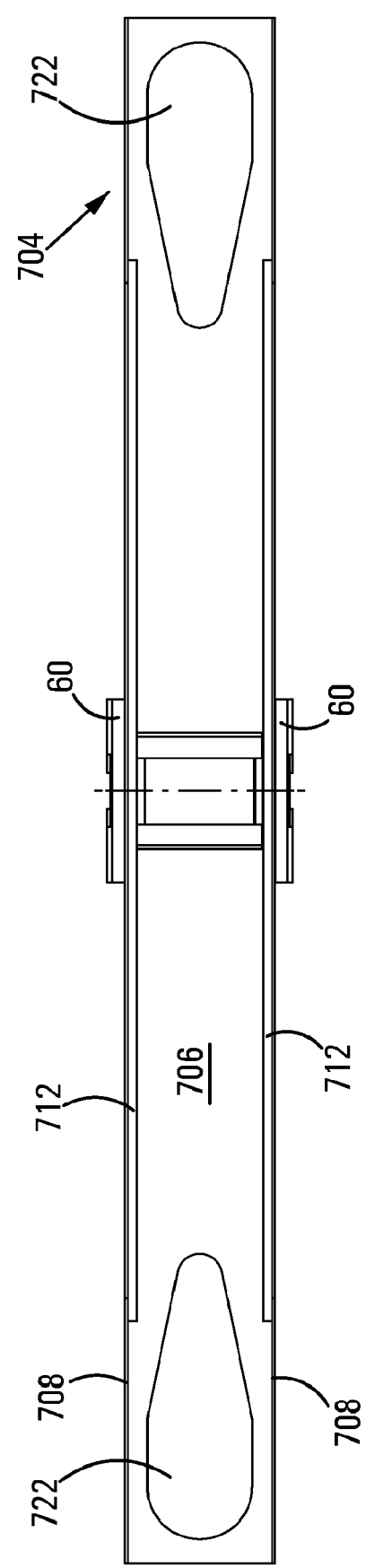

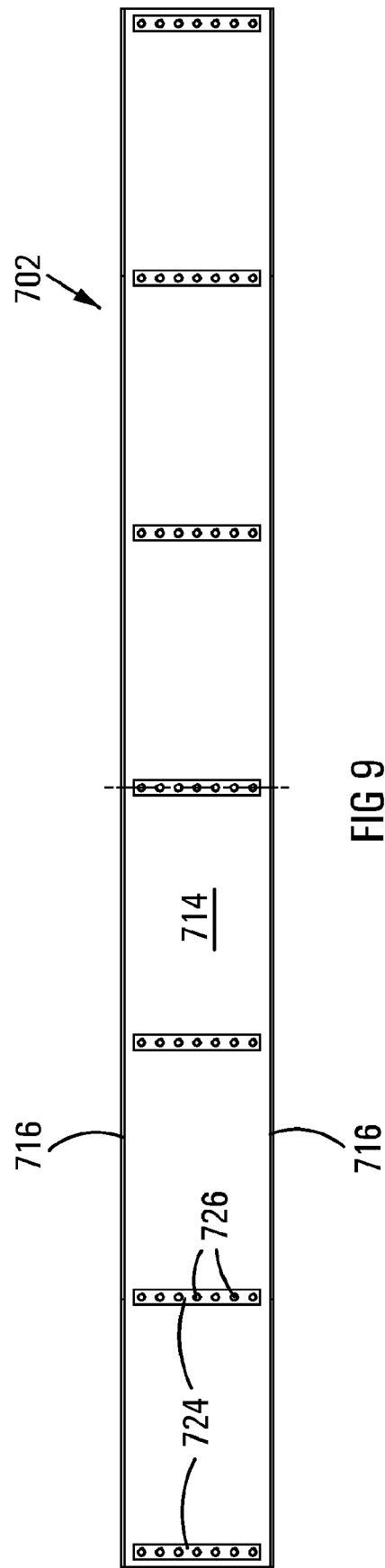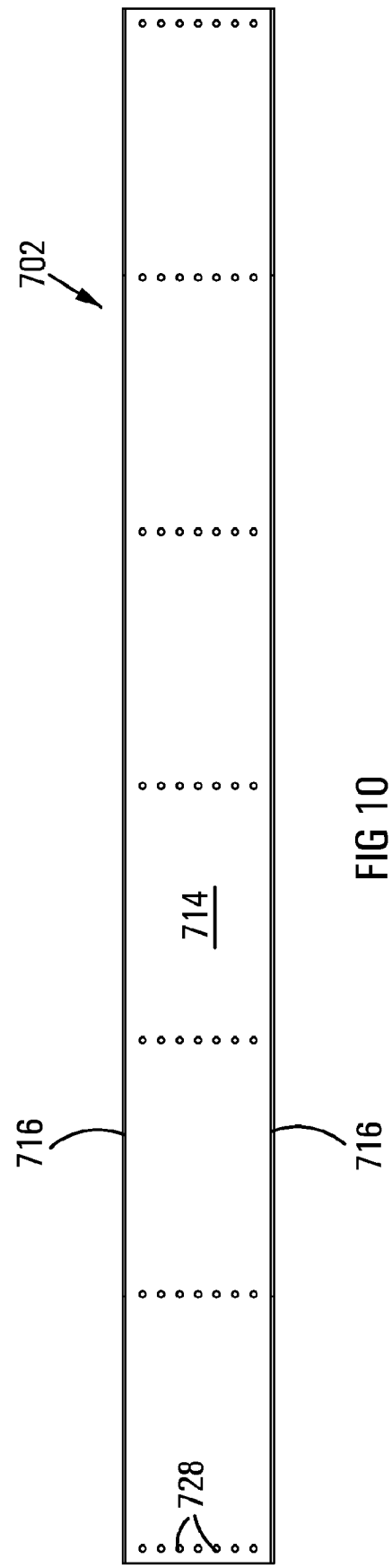

DRIVE BEAM

THIS INVENTION relates to a drive beam. In particular, the invention relates to a drive beam for a reciprocating floor, to a reciprocating floor which includes such a drive beam, and to a method of manufacturing a drive beam for a reciprocating floor.

Reciprocating floors are known and typically include two or three drive beams driven by a drive unit, with typically aluminium floor slats or planks or sections mounted to their associated drive beam to move in reciprocating fashion with the drive beam. The manufacturing of the drive beam is a time-consuming part of the manufacturing process of a reciprocating floor, requiring considerable welding time. As a result of the extensive welding required on conventional drive beams, the drive beams are susceptible to heat distortion.

According to the invention, there is provided a drive beam for a reciprocating floor, the drive beam including a pair of elongate U-shaped channel members with longitudinally extending edges arranged and welded together edge to edge to define an elongate substantially rectangular in transverse cross-section tube member with opposed welded side walls each with a lengthwise welding seam; and a pair of elongate opposed reinforcing members each fast with a respective associated welded side wall and located inside the tube member.

The reinforcing members may be in the form of lengths of flat bar, extending longitudinally inside the tube member, immediately adjacent their associated welded side walls.

The reinforcing members may be welded to their associated welded side walls along at least a portion of the welding seam which welds the channel members together. Typically, this welding seam is midway between a top edge and a bottom edge of the welded side wall, i.e. along a longitudinally extending centre line of the welded side wall. Advantageously, a single longitudinally extending weld along the centre line of the side wall thus welds together the top and bottom channel members and the reinforcing member. Less welding is required than for a conventional drive beam and, as the weld is along the centre line of the side wall and not along a top or bottom edge of the side wall, less heat distortion occurs.

Typically, the longitudinally extending edges of the channel members are provided with shallow rebates so that a gap is defined between the edges of the channel members over a portion of the length of the channel members, to allow the edges and the reinforcing member to be welded together along the gap. Typically, this gap has a height of about 4 mm.

The drive beam may include transversely extending reinforcing ribs which reinforce the tube member. The ribs are typically longitudinally equidistantly spaced and are typically located inside the tube member.

The ribs may be welded to a top wall of the tube member, with ends of the ribs being welded to the opposed reinforcing members, if desired.

The ribs may define a plurality of longitudinally spaced threaded apertures to receive bolts inserted through the top wall of the tube member.

The reinforcing members may be shorter than the channel members. When a reinforcing member is shorter than the channel members, the reinforcing member is typically located with its centre midway between ends of the channel members, thus leaving typically equally long end portions of the channel members unreinforced.

Cutouts may be provided in a bottom one of the channel members, to reduce the weight of the drive beam. Typically, the cutouts are provided in a bottom wall of the drive beams, in the end portions of the bottom channel members which are not reinforced by the reinforcing members.

The invention extends to a reciprocating floor which includes at least one drive beam as hereinbefore described.

According to another aspect of the invention, there is provided a method of manufacturing a drive beam for a reciprocating floor, the method including arranging two elongate U-shaped channel members with longitudinally extending edges edge to edge together to define an elongate substantially rectangular in transverse cross-section tube member with two opposed side walls along which the edges run, with an elongate reinforcing member located on the inside of the tube member adjacent each of said side walls; and welding the longitudinally extending edges of the channel members and their associated reinforcing members together from outside the tube member using longitudinally extending welds.

The longitudinally extending welds may be along longitudinally extending centre lines of the side walls.

The method may include welding transversely extending reinforcing ribs to a wall of one of the channel members, which wall will be a top wall of the tube member in use, prior to arranging the channel members edge to edge. The ribs may be equidistantly spaced along the length of the channel member, and may define a plurality of longitudinally spaced threaded apertures to receive bolts inserted through the top wall of the tube member.

The method may include welding ends of the ribs to the opposed reinforcing members, prior to arranging the channel members edge to edge.

The invention will now be described, by way of example only, with reference to the accompanying diagrammatic drawings in which FIG. 1 shows a three-dimensional bottom view of a portion of a reciprocating floor in accordance with the invention, with portions sectioned or cut away or omitted for clarity;

FIG. 2 shows a side elevational view of a portion of the reciprocating floor of FIG. 1, with portions sectioned or cut away for clarity;

FIG. 3 shows a transverse vertical sectioned view of the reciprocating floor of FIG. 1, taken at III-III in FIG. 2;

FIG. 4 shows an enlarged portion of FIG. 3;

FIG. 7 shows an elevational side view of a drive beam;

FIG. 8 shows a top plan view of a bottom or lower channel member of the drive beam of FIG. 7;

FIG. 9 shows a bottom plan view of a top or upper channel member of the drive beam of FIG. 7;

FIG. 10 shows a top plan view of the upper channel member of FIG. 9.

Figure 1:
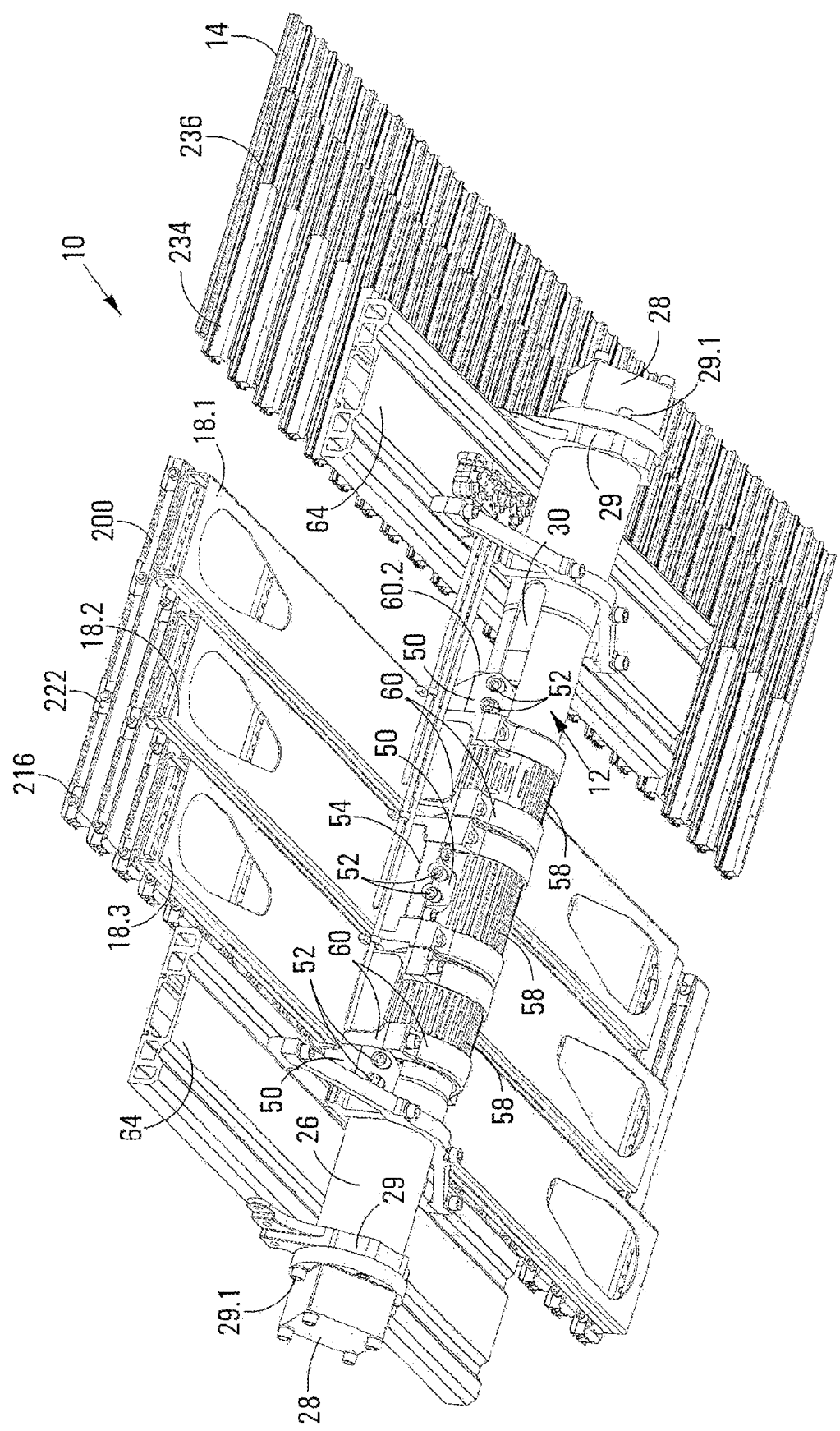

Referring to FIGS. 1 to 3, reference numeral 10 generally indicates a reciprocating floor or reciprocating floor conveyor in accordance with the invention. The reciprocating floor 10 shown is of the kind which is typically installed in a vehicle such as a heavy cargo vehicle.

The reciprocating floor 10 comprises a plurality of elongate floor members or slats 14 arranged side by side to define a floor surface 16 (see FIG. 3). The slats 14 are arranged or grouped together in three groups 14.1, 14.2 and 14.3. Thus, when starting from the left in FIG. 3, the first slat, and every third slat thereafter, belongs to the group 14.1. The second slat, and every third slat thereafter, belongs to the group 14.2 and the third slat, and every third slat thereafter, belongs to the group 14.3.

The slats of the group 14.1 are attached or mounted to a transverse drive beam 18.1, the slats of the group 14.2 are attached or mounted to a transverse drive beam 18.2 and the slats of the group 14.3 are attached or mounted to a transverse drive beam 18.3.

The reciprocating floor 10 includes a linear hydraulic motor 12 by means of which the transverse drive beams 18.1, 18.2 and 18.3, and thus the groups of slats 14.1, 14.2 and 14.3, are reciprocatingly moved backwards and forwards in a particular sequence, in the direction of the double-headed arrow 20 shown in FIG. 2. The operation of a reciprocating floor or reciprocating floor conveyor is well known to those skilled in the art, and only a very brief description of the sequence of the displacement of the groups of slats 14.1, 14.2 and 14.3 will be given.

In order to displace a load, such as a load of wood chips supported on the floor surface 16, the group of slats 14.3 is displaced longitudinally by means of the transverse drive beam 18.3 in, say, the direction of arrow 23 shown in FIG. 2 of the drawings. Thereafter, the group of slats 14.2 is displaced by means of the transverse drive beam 18.2 in the direction of arrow 23, followed by the displacement of the group of slats 14.1 by means of the transverse drive beam 18.1 in the direction of the arrow 23. As will be appreciated, with one third of the slats 14 only being displaced each time, the load supported on the floor surface 16 remains stationary. Once all three groups 14.1, 14.2 and 14.3 have been displaced in the direction of the arrow 23, all three groups 14.1, 14.2 and 14.3 are simultaneously displaced in the direction of the arrow 24 shown in FIG. 2, thus moving the entire load supported on the floor surface 16 in the direction of the arrow 24. This process is then repeated cyclically in order to move the load stepwise in the direction of the arrow 24 over the floor surface 16.

The linear hydraulic motor 12 is of the general kind described in WO 2004/067967 or, more particularly, in PCT/IB2005/003187. The motor 12 includes an elongate circular cylinder 26. Ends of the cylinder 26 are closed by means of end caps 28. The end caps 28 are bolted to the cylinder 26. Each end cap 28 comprises an end head with an integral spigot portion 28.1 (see FIG. 5) which slides into the cylinder 26 with the end head abutting against a flange 29 provided at the open ends of the cylinder 26. Threaded bolts 29.1 screw into threaded bolt holes in the flange 29 to mount the end caps 28 to the cylinder 26. An O-ring seal 29.2 is provided on the spigot portion to ensure adequate sealing between the spigot portion and the cylinder 26.

The end caps 28 include internal valve arrangements which are not shown. Advantageously, with the arrangement of the end caps 28 as shown, hydraulic fluid ports can simply extend through the end caps 28. In the embodiment of the invention shown in the drawings, it is required that two of the hydraulic fluid ports must have a tube 29.3 which extends into the cylinder 26 and then respectively through a head portion of a piston 34.3 and through a head portion of a piston 34.1, which will be described in more detail hereinafter. Each tube 29.3 is simply bolted to the spigot portion 28.1 of the end cap 28.

Six longitudinally extending apertures or slots 30 are provided in the cylinder 26. The slots 30 are arranged in three longitudinally spaced groups of two each, with the two slots 30 of each group being located on diagonally opposed sides of the cylinder 26, facing sideways in a horizontal direction. In the embodiment of the linear hydraulic motor 12 shown in the drawings, the cylinder 26 has an internal diameter of about 140 mm, a length of about 1570 mm (including the flanges 29) and slots 30 with a length of about 300 mm each. Centres of the slots 30 are spaced about 356 mm.

Three pistons 34.1, 34.2 and 34.3 are axially, reciprocatingly slidingly, located inside the cylinder 26. End portions of each piston 34.1, 34.2, 34.3 are hollow, thus advantageously reducing the weight of the pistons. Furthermore, the opposed hollow end portions of the piston 34.2 each define a bore 36 within which elongate end portions of the piston 34.1 and 34.3 are received in a sealing and sliding manner. The end portions of the pistons 34.1 and 34.3 are thus guided in the bores 36. As will thus be noted, between the cylinder 26 and the piston 34.1, 34.2 and 34.3, four varying capacity chambers 38.1, 38.2, 38.3 and 38.4 for receiving and expelling hydraulic fluid are defined. These chambers can clearly be seen in FIG. 5 of the drawings.

Annular critical hydraulic fluid seals 40 seal the piston 34.1 and 34.3 against an interior surface of the cylinder 26. Similarly, annular hydraulic fluid seals 42 seal the pistons 34.1 and 34.3 against interior surfaces of the bores 36 defined by the piston 34.2. If desired, annular bands of friction-reducing material, such as Vesconite (trade name), nylon or brass which can act as bearing surfaces for the piston 34.2, may be provided in order to facilitate axial displacement of the piston 34.2 inside the cylinder 26. Such annular bands are however not shown in the drawings.

Each piston 34.1, 34.2 and 34.3 is associated with two force transfer members or wings 50. The force transfer members 50 thus extend through associated slots 30 in use to transfer force from the pistons 34.1, 34.2 and 34.3 to which the force transfer members 50 are secured, sideways through the cylinder 26 to an associated one of the transverse drive beams 18.1, 18.2, 18.3. The force transfer members 50 are each bolted by means of two bolts 52 to its associated piston 34.1, 34.2 or 34.3. A curved contact area 51 between each force transfer member 50 and its associated piston 34.1, 34.2, 34.3 is corrugated, providing an interlocking feature to inhibit relative longitudinal displacement of the piston 34 and the force transfer member 50. This arrangement can be clearly seen in FIG. 5 of the drawings.

As can be seen in FIG. 1 of the drawings, the force transfer members 50 connecting the pistons 34.1 and 34.3 to the drive beams 18.1 and 18.3 extend upwardly to engage the drive beams 18.1 and 18.3 respectively against side walls thereof. In contrast, the force transfer members 50 connecting the piston 34.2 to the drive beam 18.2 are mounted to a bottom wall or floor of the transverse drive beam 18.2, also employing a corrugated contact arrangement as shown at 54 in FIG. 1.

Each pair of slots 30 is associated with a split collar 58 comprising an upper half 58.1 and a lower half 58.2. The upper and lower halves 58.1, 58.2 of the collars 58 encircle the cylinder 26. The four half collars 58 associated with the end apertures or slots 30 abut the four outer force transfer members 50 to travel with the outer force transfer members 50 along the length of the cylinder 26 in the directions of the double-headed arrow 20 as shown in FIG. 2 of the drawings with the force transfer members 50 limiting the longitudinal travel of the collars 58 to the length of the slot 30 minus the width of the force transfer members 50, i.e. about 190 mm. The centre collar 58 defines two apertures corresponding to the centre slots 30 through which the two centre force transfer members 50 project. Typically, one slot is provided in the upper collar half 58.1 and one slot is provided in the lower collar half 58.2. Preferably, the upper and lower collar halves 58.1, 58.2 do not meet in a horizontal plane, but rather in a plane which is arranged at an angle to the horizontal. Semicircular brackets or split rings 60 bolt the split collars 58 to their associated drive beams 18.1, 18.2 and 18.3. Each of the transverse drive beams 18.1, 18.2, 18.3 is thus supported by an associated one of the upper collar halves 58.1. When a piston, such as the piston 30.2 is displaced axially inside the cylinder 26, its associated transverse drive beam 18.2 moves in unison with the piston 30.2, sliding on the upper collar half 58.1 over the cylinder 26. The force transfer members 50 associated with the drive beams 18.1 and 18.3 are bolted against the side walls of the drive beams 18.1 and 18.3 respectively at 60.1 (see FIG. 2), but also against outermost split rings 60 at 60.2 in FIG. 2, using bolts that are thus parallel to the longitudinal axis of the cylinder 26.

Figure 5:
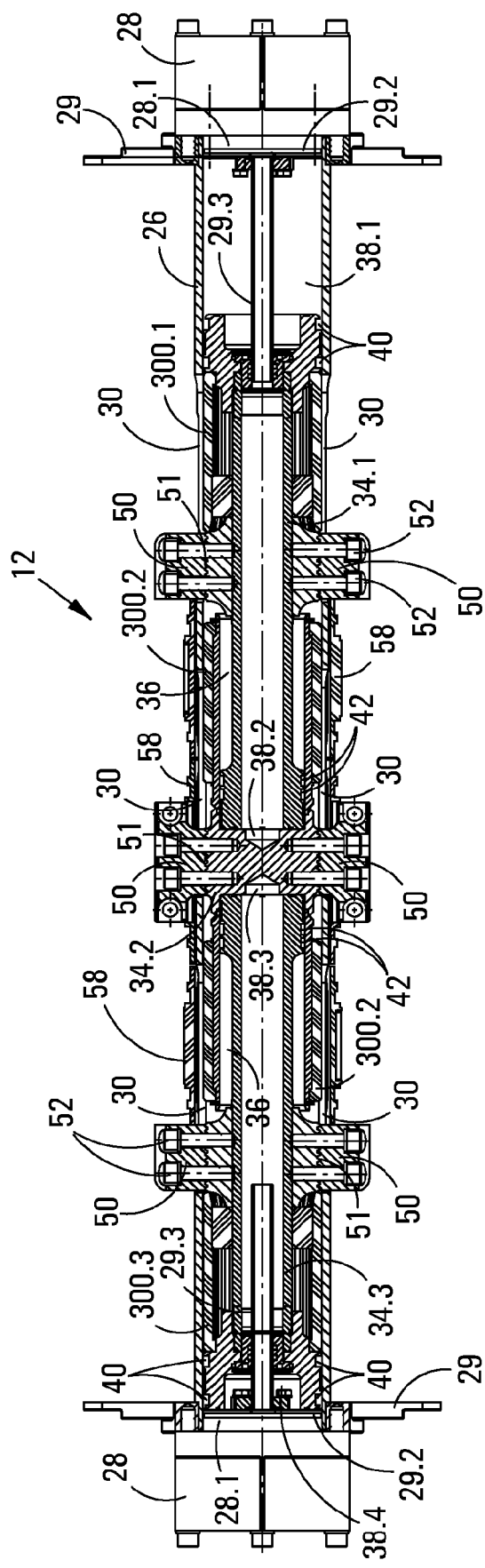
FIG. 5 shows a horizontal longitudinal section through a linear hydraulic motor of the reciprocating floor of FIG. 1.

As can be clearly seen in FIG. 5 of the drawings, each piston 34.1, 34.2, 34.3 has at least one longitudinally extending portion which is of a substantially reduced diameter compared to the inside diameter of the cylinder 26. Over these portions, internal reinforcing members 300.1, 300.2 and 300.3 are located. The piston 34.2 supports two internal reinforcing members 300.2, each in the form of a circular cylindrical sleeve which is fastened to the piston 34.2 by grub screws (not shown). The reinforcing members 300.1 and 300.3 extend longitudinally from immediately behind the head portion of the pistons 34.1 and 34.3 respectively to where the force transfer members 50 are bolted to the pistons 34.1 and 34.3 and are thus caught between the head portions of the pistons and the force transfer members 50. The reinforcing members 300.2 extend longitudinally from ends of the piston 34.2 some distance towards where the force transfer members 50 are bolted to the piston 34.2. Typically, the reinforcing members 300.1, 300.2 and 300.3 are of a synthetic plastics or polymeric material such as Vesconite (trade name), which is a low kinetic or dynamic friction material.

The reinforcing members 300.1, 300.2 and 300.3 are concentric with the cylinder 26, and in particular with the internal surface thereof, and bridge the apertures or slots 30 when sliding past the slots 30. The reinforcing members 300.1, 300.2, 300.3 fit with a slight clearance of about 0.25 mm inside the cylinder 26.

Figure 6:
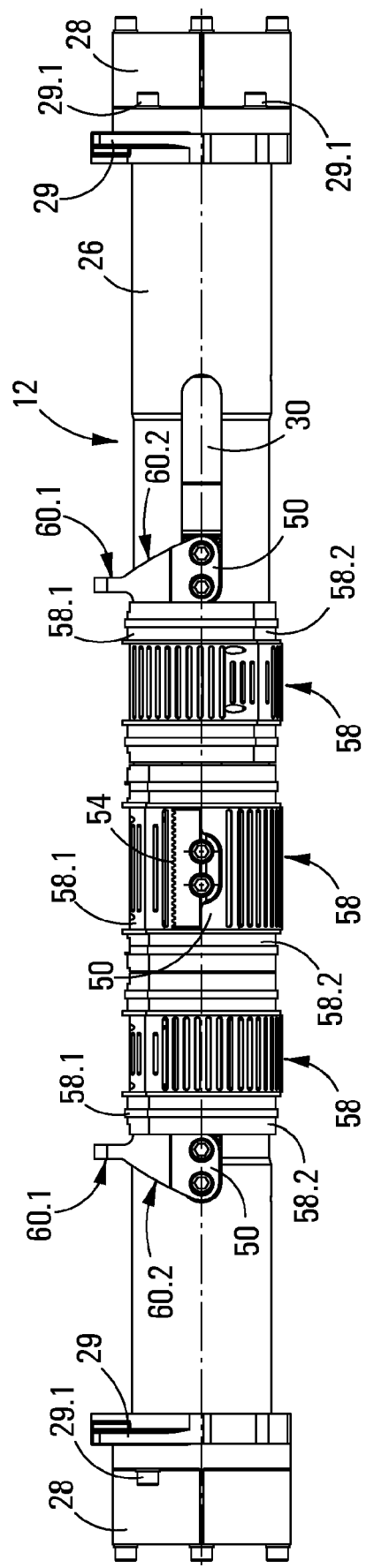
FIG. 6 shows a side elevational view of the linear hydraulic motor of FIG. 5.

The reciprocating floor conveyor 10, as illustrated, forms part of a heavy load-bearing vehicle, with the floor surface 16 defining the load-bearing surface of the vehicle. In FIG. 1 of the drawings, two transverse chassis beams 64 of the vehicle, from which the linear hydraulic motor 12 is suspended, are shown. Also in FIG. 1, the three drive beams 18.1, 18.2 and 18.3 are shown in positions where they are as far to the left as possible, i.e. with all three of the pistons 34.1, 34.2 and 34.3 as far to the left inside the cylinder 26 as is possible, as is shown in FIGS. 5 and 6 of the drawings. In order to displace the transverse drive beam 18.1 to the right, and thus also to displace the slats of the group of slats 14.1 to the right, a hydraulic fluid, typically a hydraulic oil, is injected into the chamber 38.2 through the tube 29.3, thus forcing the piston 34.1 to the right as far as it can go. At this time, the pistons 34.2 and 34.3 can not be displaced to the left. In order to displace the piston 34.2 to the right, hydraulic fluid is then forced into the chamber 38.3 through the other tube 29.3. At this time, the piston 34.3 can not be displaced to the left. The piston 34.3 is then displaced to the right against the piston 34.2 by injecting hydraulic fluid into the chamber 38.4 (through a port in the end cap 28 which is not shown). In order to return all three of the pistons 34.1, 34.2 and 34.3 to the starting position in which they are as far to the left as possible, hydraulic fluid is forced into the chamber 38.1 (through a port in the other end cap 28 which is also not shown), thus pushing all three pistons 34.1, 34.2, 34.3 simultaneously to the left. In this fashion, the movement sequence of the group of slats 14.1, 14.2, 14.3 is established. It is however to be appreciated that the sequence can also be reversed, with all the pistons starting at the right in FIG. 5.

Force is transferred from the linear hydraulic motor 12 to the floor slats 14 via the transverse drive beams 18. It is thus very important that the slats 14 are securely mounted to the drive beams 18. In the embodiment of the invention shown in the drawings, the slats 14 are mounted to the drive beams 18 by means of associated elongate clamp members or fingers 200. Each clamp member 200 is bolted to its associated drive beam 18 by means of seven bolts passing through predrilled bolt holes and comprises a pair of opposed side walls 204. A longitudinally extending clamping slot 206 is defined between the side walls 204 of the clamp members 200. As can be clearly seen in FIG. 4 of the drawings, each floor slat 14 has a downwardly depending mounting member 208 which is received inside the clamping slot 206 and which is thus clamped inside the clamping slot 206. The mounting members 208 extend the entire length of the floor slats 14.

The drive beams 18 are hollow. The clamp members 200 are longitudinally spaced and transversely arranged relative to the drive beams 18. In the embodiment of the invention shown in the drawings, there are twenty-one floor slats 14 and thus twenty-one clamp members 200, with seven clamp members 200 mounted to each of the drive beams 18.1, 18.2 and 8.3 respectively.

The mounting members 208 are clamped inside the clamping slots 206 by means of nuts 216 and bolts 218. As can be clearly seen in FIG. 4 of the drawings, the bolts 218 pass below the mounting members 208. Elongate washer elements 222, which are L-shaped in transverse cross-section, are located between each bolt head and a side wall 204, and between each nut 216 and a side wall 204. The washer elements 222 bear against upper portions of the side walls 204 so that when the nuts 216 and bolts 218 are tightened, the side walls 204 move closer together in upper regions thereof, bending about lower regions thereof. The washer elements 222 located between the nuts 216 and the side walls 204 also interfere with the rotation of the nuts 216, thus acting to lock the nuts 216.

Each mounting member 208 has a thickened portion or key 224. The clamping slot 206 is shaped complementary to the key portion, being narrower in an upper region above the key portion, thereby to lock the key portion inside the clamping slot and preventing upwards movement of the mounting member 208 from the clamping slot 206.

The floor slats 14 are supported on elongate support beams 234 and elongate bearing members 236 sandwiched between the floor slats 14 and the support beams 234. Thus, both the support beams 234 and the bearing members 236 extend longitudinally underneath the floor slats 14, with the bearing members 236 providing bearing surfaces over which the floor slats 14 can slide in a reciprocating fashion as driven by their associated drive beams 18.

Referring to FIG. 7 of the drawings, each drive beam 18 comprises a top or upper channel member 702 and a bottom or lower channel member 704. In FIG. 7, the centre drive beam 18.2 is illustrated. The drive beams 18.1 and 18.3 are similar to the drive beam 18.2 and will not be described in any detail separately. However, it is to be appreciated that the drive beam 18.2 is attached in a different fashion to its associated force transfer members 50 than are the drive beams 18.1 and 18.3, causing constructional differences between the drive beams 18.1 and 18.3 on the one hand, and the drive beam 18.2 on the other hand. These constructional differences are however not important for purposes of the present invention and will not be elaborated on.

Figure 11:
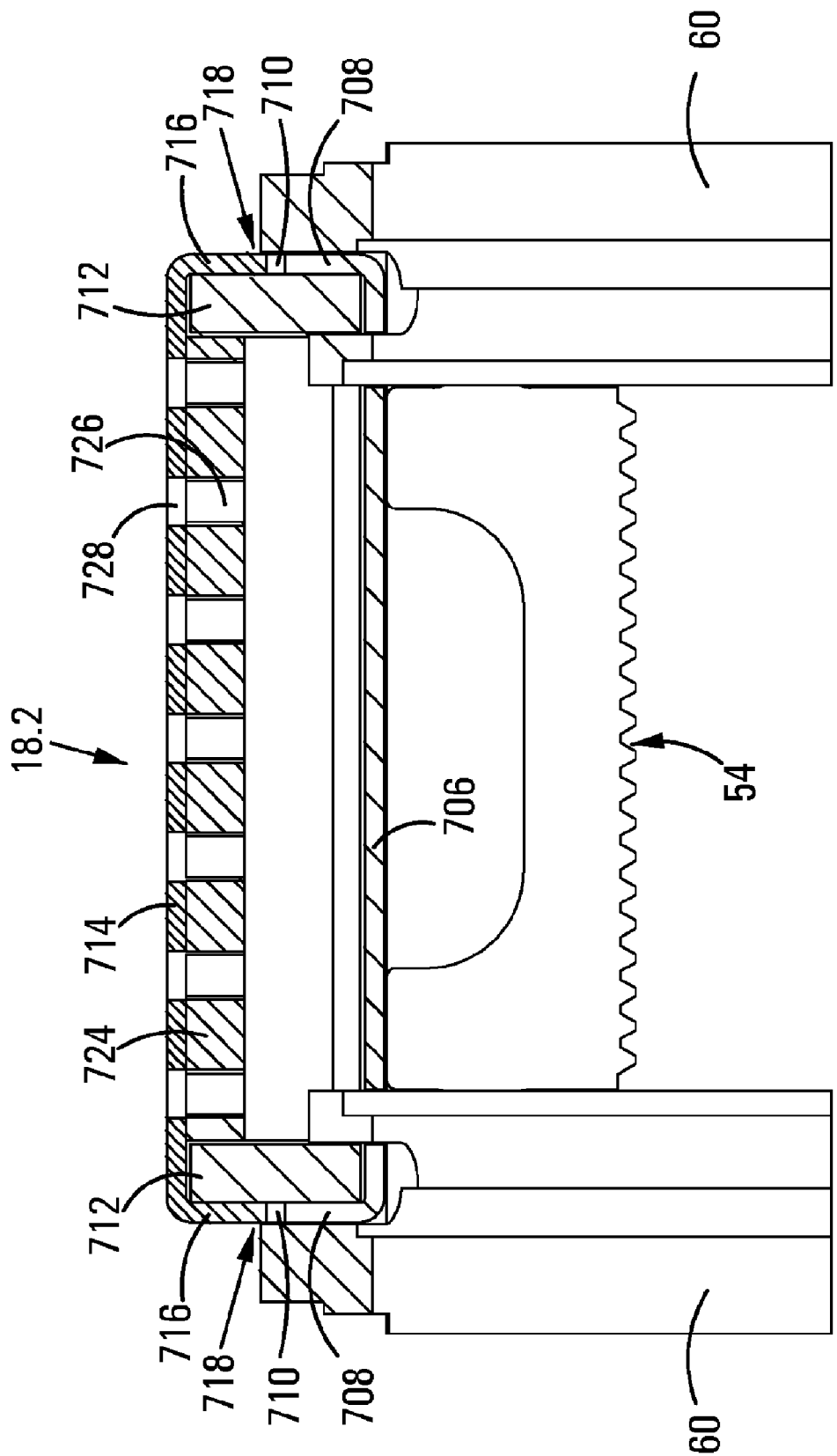
FIG. 11 shows an end view of the drive beam of FIG. 7.

Each channel member 702, 704 defines a shallow U-shaped channel so that when the channel members 702, 704 are placed edge to edge as shown in FIGS. 7 and 11 of the drawings, an elongate hollow drive beam with a thickness of only about 45 mm is defined.

The bottom channel member 704 has a bottom wall or floor 706 with two opposed side walls 708 extending longitudinally. The bottom channel member 704 has a length of about 2055 mm. The upper edge of each side wall 708, over a centrally located portion thereof with a length of about 1400 mm, is rebated so that an elongate gap 710 with a width of about 4 mm is defined between the upper channel member 702 and the lower channel member 704 when they are placed edge to edge, as shown in FIG. 7 of the drawings.

The upper channel member 702 comprises an upper wall 714 and two side walls 716 which in use are downwardly depending from the upper wall 714. When placed edge to edge as shown in FIG. 7 of the drawings, the side walls 708 and the side walls 716 together define side walls 718 of the drive beam 18.2.

Reinforcing members, in the form of lengths of flat bar 712 (see FIG. 8) are associated with each of the side walls 718 of the drive beam 18.2. The flat bars 712 each have a length which is slightly greater than the length of the gap 710, as can be clearly seen in FIG. 8 of the drawings.

The upper channel member 702 and the lower channel member 704 are welded together along the edges of the side walls 708 and side walls 716 where they meet, and along the gap 710. A single elongate weld seam thus extends from one end of the drive beam 18.2 to the other end of the drive beam 18.2, on each side wall 718 thereof, with the weld seam being vertically equidistantly spaced from the upper wall 714 and the floor 706. Along the length of the elongate gaps 710, the weld seams also weld the flat bars 712 to their associated walls 718.

Two elongate cutouts 722 are provided in the floor 706 to reduce the weight of the drive beam 18.2. Typically, the cutouts 722 extend past ends of the flat bars 712, with edges of the cutouts 722 being arranged at an angle to the longitudinal axis of the drive beam 18.2 where they extend past the ends of the flat bars 712.

Reinforcing ribs 724 are equidistantly spaced and transversely arranged along the length of the drive beam 18.2, and in particular along the length of the upper wall 714. The ribs 724 are welded to a lower surface of the upper wall 714 and are thus located inside the tubular body defined by the upper channel member 702 and lower channel member 704. If desired, ends of the ribs 724 may also be welded to the flat bars 712, where the ribs 724 and flat bars 712 do indeed meet.

Each rib 724 defines seven threaded bolt holes 726 to receive the seven bolts of each clamp member 200 bolted to the drive beam 18.2. Predrilled bolt apertures 728 are thus also provided in the upper wall 714 of the upper channel member 702 (see FIG. 10).

Upper split rings 60, forming part of the two pairs of split rings 60 which bolt the split collars 58 to the drive beam 18.2, are shown in FIGS. 7, 8 and 11.

The drive beams 18, as illustrated, require less welding to manufacture than conventional drive beams of which the Applicant is aware. Furthermore, the longitudinal welds along the side walls of the drive beams are equidistantly spaced from upper and lower edges of the side walls. These two factors ensure that the drive beams, as illustrated, are less susceptible to bending or distortion as a result of the welding process. The use of welding consumables, and welding time, are also drastically reduced since the upper and lower channel members and the reinforcing flat bars are welded together on each side of the drive beam using a single longitudinally extending weld. The drive beams, as illustrated, can also advantageously be manufactured from two U-shaped channel members, which are less expensive than the rectangular tubing which has conventionally been used for drive beams.

The invention claimed is:

1. A drive beam for a reciprocating floor, the drive beam including
 a pair of elongate U-shaped channel members with longitudinally extending edges arranged and welded together edge to edge to define an elongate substantially rectangular in transverse cross-section tube member with opposed welded side walls each with a lengthwise welding seam, the lengthwise welding seam being midway between a top edge and a bottom edge of the welded side wall, i.e. along a longitudinally extending centre line of the welded side wall; and
 a pair of elongate opposed reinforcing members each fast with a respective associated welded side wall and located inside the tube member.

2. The drive beam as claimed in claim 1, in which the reinforcing members are in the form of lengths of flat bar, extending longitudinally inside the tube member, immediately adjacent their associated welded side walls.

3. The drive beam as claimed in claim 1, in which the reinforcing members are welded to their associated welded side walls along at least a portion of the welding seam which welds the channel members together.

4. The drive beam as claimed in claim 1, which includes transversely extending reinforcing ribs inside the tube member which reinforce the tube member.

5. The drive beam as claimed in claim 4, in which the ribs define a plurality of longitudinally spaced threaded apertures to receive bolts inserted through a top wall of the tube member.

6. The drive beam as claimed in claim 1, in which the reinforcing members are shorter than the channel members, the reinforcing members being located with their centres midway between ends of the channel members, thus leaving equally long end portions of the channel members unreinforced.

7. A reciprocating floor which includes at least one drive beam as claimed in claim 1.

8. A method of manufacturing a drive beam for a reciprocating floor, the method including
 arranging two elongate U-shaped channel members with longitudinally extending edges edge to edge together to define an elongate substantially rectangular in transverse cross-section tube member with two opposed side walls along which the edges run, with an elongate reinforcing member located on the inside of the tube member adjacent each of said side walls; and
 welding the longitudinally extending edges of the channel members and their associated reinforcing members together from outside the tube member using longitudinally extending welds, the longitudinally extending welds being along longitudinally extending centre lines of the side walls.

9. The method as claimed in claim 8, which includes welding transversely extending reinforcing ribs to a wall of one of the channel members, which wall will be a top wall of the tube member in use, prior to arranging the channel members edge to edge with the reinforcing ribs on the inside of the tube member.

10. The method as claimed in claim 9, which includes welding ends of the ribs to the opposed reinforcing members, prior to arranging the channel members edge to edge.

* * * * *